July 20, 1954  W. L. KELSEY  2,684,070
SURGICAL CLIP
Filed March 23, 1953  2 Sheets-Sheet 1
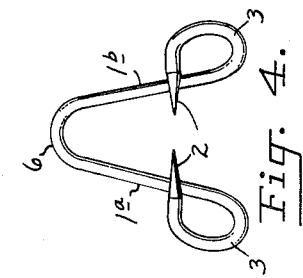
Fig. 4.
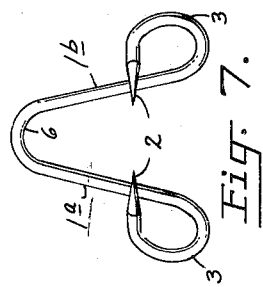
Fig. 7.
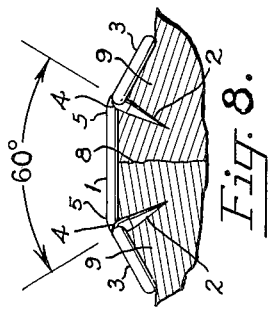
Fig. 8.
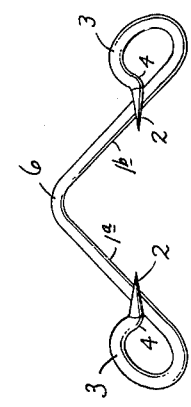
Fig. 3.
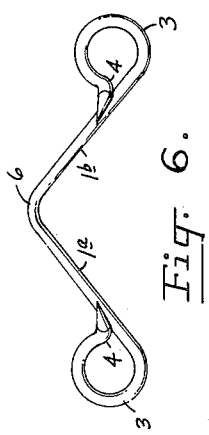
Fig. 6.
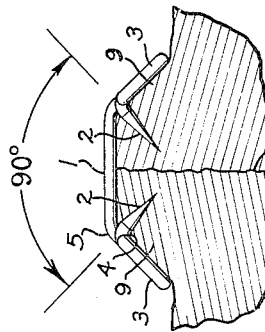
Fig. 9.
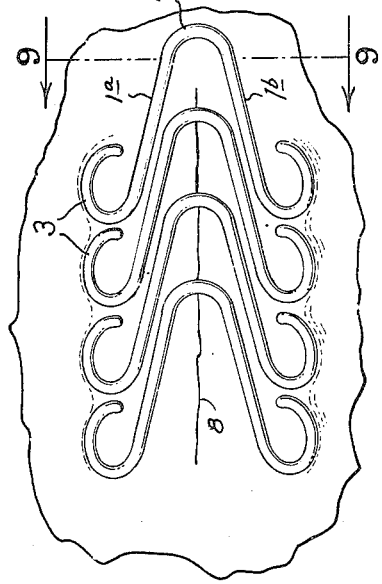
Fig. 10.
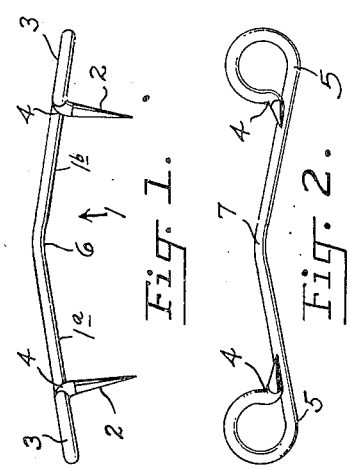
Fig. 1.
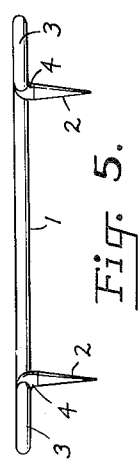
Fig. 2.
Fig. 5.
INVENTOR.
Walter L. Kelsey
BY
Atty.

July 20, 1954 W. L. KELSEY 2,684,070
SURGICAL CLIP
Filed March 23, 1953 2 Sheets—Sheet 2
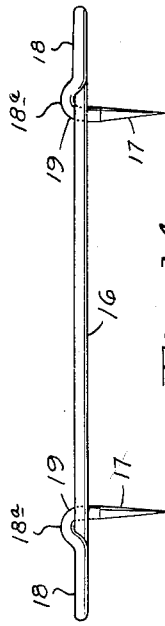
Fig. 14.
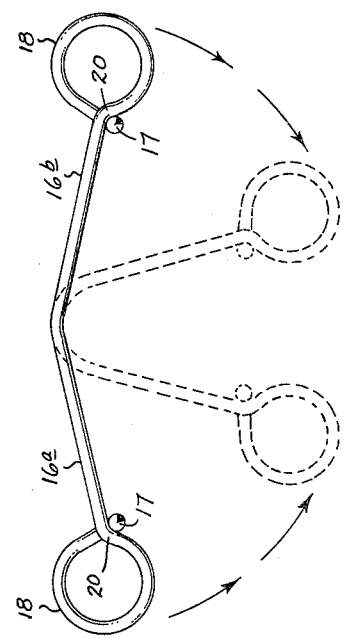
Fig. 15.
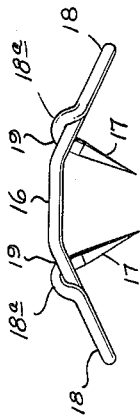
Fig. 16.
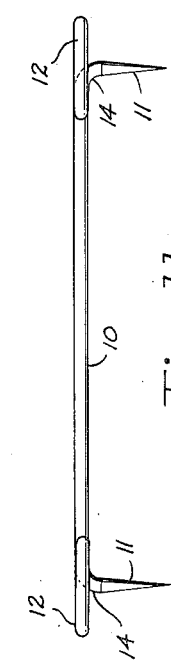
Fig. 11.
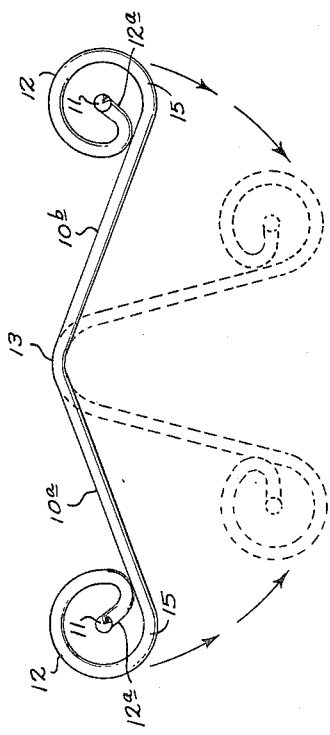
Fig. 12.
Fig. 13.
INVENTOR.
Walter L. Kelsey
BY
Atty.

Patented July 20, 1954

2,684,070

UNITED STATES PATENT OFFICE 2,684,070

SURGICAL CLIP

Walter L. Kelsey, Portland, Oreg.

Application March 23, 1953, Serial No. 344,008

11 Claims. (Cl. 128—337)

My invention relates to wound clips and clamps which are used by surgeons in lieu of sutures or stitches for joining together the marginal edges of tissue cut in making a surgical operation.

Wound clips have been used by surgeons for many years, but they have certain inherent limitations and disadvantages and thus have not wholly supplanted sutures, although they may be applied much more rapidly, will hold the marginal edges of wounds in closer approximation, develop less scar tissue, and are much more easily removed.

Some of the disadvantages noted in the use of wound clips are that (1) they become elevated above a wound margin and thus do not effect good approximation of tissue. (2) Many types have projecting portions thereon which catch upon overlying dressing. This produces pain to the patient while wearing such clips and frequently when said dressings are removed and replaced. (3) Due to the formation thereof and the clamping action, said clips frequently produce pressure necrosis of tissue because of the clamping action of said clips. (4) Said clips frequently localize pressure at their engaging points which produces pain while said clips remain in place. (5) Said wound clips must be made of relatively stiff but distortable material, and said material, when bent into clamping position, frequently forms itself into a plane, arc or bend which does not conform to the compressed edges of the wound, and thus produces localized pressure upon the edges of said wound and irritation thereof. (6) Many wound clips are so formed that they cannot be placed closely together to effect good skin closure. (7) If said clips are capable of close approximation along the length of a wound, they frequently do not permit air to reach the wound and permit secretions to exude and be absorbed by the dressing.

My invention is directed to wound clips which eliminate said foregoing difficulties. Additionally, wound clips made in accordance with my invention pierce the skin cleanly with prongs which are arranged normal to the tissue immediately adjacent the wound, bend uniformly and equally across said wound and conform to the irregular tissue which they span, are susceptible of insertion and removal with ordinary instruments possessed by a surgeon, are economical to manufacture, being simple in structure, and at the same time seat firmly and securely at points at opposite sides of a wound and span the latter without producing any protuberances which might engage dressings, and are adapted to be inserted in close spaced relationship along the wound and to be closed in closely nesting relationship, holding the marginal edges of said wound in close abutment and gently, but firmly, pressing the tissue in place without producing localized pressure.

The details of my invention are hereinafter described with reference to the accompanying drawings, in which:

Fig. 1 is a side elevation of a wound clip embodying my invention;

Fig. 2 is a bottom view thereof taken in a direction looking at the pointed prongs thereof;

Fig. 3 is a view similar to Fig. 2 but with said wound clip shown in partially closed or gripping position;

Fig. 4 is a similar view showing the prongs in fully bent or engaging position;

Fig. 5 is a side elevation of a modification of my invention taken in substantially the same position as the embodiment illustrated in Fig. 1;

Fig. 6 is a view looking at the pronged face of said modification in partly bent condition;

Fig. 7 is a view similar to Fig. 6 of this modification, shown in fully bent or engaging position;

Fig. 8 is a side elevation of the clip shown in Figs. 5, 6 and 7 and, in elevation, shows the angularity of said clip when it is bent in the form illustrated in Fig. 7 and spanning a wound to be closed;

Fig. 9 is a view of the embodiment shown in Figs. 1 to 4, inclusive, showing the manner in which said embodiment spans a wound and holds the marginal edges in close proximity and indicates the angular arrangement of the prongs thereof when in use, said figure being taken on the line 9—9 in Fig. 10;

Fig. 10 is a plan view of tissue showing a cut to be closed by a plurality of the wound clips, illustrated in Figs. 1 to 4, in place spanning said cut;

Fig. 11 is a second modification of my invention showing a wound clip in elevation;

Fig. 12 is a plan view of said second modification illustrating in dotted outline and by arrows the movement of said surgical clip as it moves from its original position to bent form for closing an incision;

Fig. 13 is a side elevation of said second modification illustrating the angular relationship of the pointed prongs thereof;

Fig. 14 is a side elevation of a third modification illustrating the manner in which the prongs overlie the mid-portion of said wound clip;

Fig. 15 is a plan view of said third modification illustrating in dotted outline the form to which it is bent when in gripping position, and also indicates in dotted outline the manner in which said clip bends when being seated; and Fig. 16 is a side elevation of said third modification when formed into eventual seating position.

In the embodiment of my invention illustrated in Figs. 1 to 4, inclusive, and Figs. 9 and 10, said wound clip comprises a middle portion 1 terminating in two downwardly bent prongs 2, one at each end of said wound clip. Lying immediately inwardly of each of said prongs is a looped portion 3 which lies in a single plane, as is illustrated in Fig. 1. The point of joinder between a prong and its associated loop portion is made at a relatively sharp bend 4. Said sharp bend subtends substantially a 90° angle. The point of merger 5 between the end of the middle portion and the loop portion at each end thereof is made upon a smooth sweep, as is shown in Fig. 2, so that there is no tendency of said clip to bend at this point. Substantially at the midpoint is an obtuse bend 6. Thus, each of the halves 1a and 1b of said middle portion makes an obtuse angle with each other but lie in the same plane with the loop portion at the end thereof and extend at right angles to the sharpened prong 2 at the extremity thereof.

In addition to the obtuse bend 6, when viewing said wound clip in elevation, I form an oblique bend 7, as viewed in plan in Fig. 2. Thus, at the mid-point there is a compound bend. The obtuse bend 6 produces an arched wound clip when viewed in elevation, and an offset middle portion when viewed in plan. I deem this quite an important feature because when pressure is applied to the wound clip by engagement of a clamp to the peripheral surfaces of the looped portions at the end thereof and pressure is applied, said wound clamp progressively forms into the structures illustrated in Figs. 3, 4, 9 and 10 of the drawings.

As may be seen in Figs. 9 and 10, the pointed prongs form substantially a right angle with respect to each other and pierce the tissue normal to the surface thereof. In bringing the tissue into close abutment at the sides of a cut 8, it compresses it at 9 to form a rather prominent ridge or pucker. This is common in closing any cut and necessary to produce good aproximation of tissue. The position of the prongs, however, arranged to pierce the tissue at right angles and to arrange the loops in flat engagement with the outer margins of the compressed portions is characteristic of wound clips embodying my invention. While said clips are being bent inwardly and the prongs moving from the degree of angularity shown in Fig. 1 to that shown in Fig. 9, the middle portions bend into virtually U-shaped arrangement, considering only the middle portions thereof, as is shown in Fig. 10.

I have bent wound clips with clamping devices innumerable times, both free of tissue and also in connection with tissue, to determine that the wound clip will always form the pattern illustrated in Figs. 9 and 10. They do invariably, even though no forming device is used other than applicators engaging the outer margins of the loop portions 3. The wound clamps span the compressed portions 9 without localized pressure, overlie the cut 8, gently hold said tissue and press against it, bend always at the mid-point, with substantially the short sweep which characterizes them at the mid-point, and as illustrated in Fig. 10, and with the half portions 1a and 1b forming identical angles of divergence with said mid-point. Thus, they may be nested one within the other, as is shown in Fig. 10. They lie along the faces of the compressed portions 9 and tend to engage said portions, span the cut portion, and follow the contour exactly. Thus, there are no projecting portions which may be engaged by dressing to attempt to dislodge said wound clips before the wound is healed. This facilitates dressing, eliminates pain, and produces early healing. Although said clips are spaced quite closely together, as is viewed in Fig. 10, they provide substantial open areas between them, particularly adjacent the cut. This promotes the exudation of secretions therefrom which may be absorbed by the overlying dressing.

In the modification illustrated in Figs. 5 to 8, inclusive, I give identical reference characters to the various parts thereof because said modification differs from the embodiment illustrated in Figs. 1, 2, 3, 4, 9 and 10 only in that the modification there is no obtuse bend 6.

Figs. 1 and 5 are comparable. As is illustrated in Fig. 1, there is a slightly inclined middle portion forming an obtuse angle between the halves 1a and 1b of said middle portion, while in Fig. 5 said middle portion is straight. When wound clips made in accordance with the modification are inserted in tissue by compression and flexure, they assume the relative position illustrated in Fig. 8. It is to be noted therein that the prongs subtend a 60° angle with each other rather than the characteristics 90° angle attained by the embodiment first described. I feel that the 90° angle is superior to the 60° angle attained by the modification, although the modification is superior to anything which has had my attention for use in closing wounds by clips. The looped portions in said modification lie along the faces of tissue, form uniformly, nest, may be arranged in close proximity with each other and yet allow air to reach the wound and secretions to exude, and all of the other advantages attained in the first embodiment, save and except the difference in angular arrangement commented on.

In the second modification illustrated in Figs. 11, 12 and 13, there is present in a wound clip a middle portion 10 comprising halves 10a and 10b, prongs 11 at each end thereof, and associated loop portions 12 lying immediately inwardly of said prongs. There is an oblique bend 13 at the mid-point, a sharp bend 14 between the prong and the loop, and a gradual point of merger 15 between the middle portion and each of said loops. In this modification, however, the loop portion forms substantially a complete circle and the terminal end thereof 12a extends radially inwardly, as may be seen in Fig. 12. The sharp end 14 joins the prong 11 to said loop and said prong extends at a right angle to the plane of said loop as in the other devices described. Said greater length of loop and the central positioning of the prong therein provides a little greater area of contact with tissue and a greater stability, in my opinion, in preventing inadvertent movement or shifting of said clip when it rests upon the skin. In drawing this conclusion, I am considering the form of the loops when they define circles of equal diameter. The size of each loop, however, is limited to a large degree by the width of the face of the compressed portions 9 lying adjacent a cut, as is shown in Figs. 8 and 9. By arranging the prongs centrally of the loops, the portions of said loops adjacent the point of merger 15 with the middle portion tend to crowd the tissue a little tighter and more firmly without localized pressure, and I deem this desirable in some instances.

In the modification shown in Figs. 14, 15 and 16, a wound clip is shown having the middle portion 16 comprising halves 16a and 16b, the prongs 15 at the ends thereof joined by intermediate loop portions 18 and joining said loop portions by a sharp bend 19. The loop portions merge with the middle portions on an OG curve in this modification. It is a little more abrupt than in the other embodiments of my invention, but still quite smooth so that there is no tendency of the wound clip to bend further at this point when pressure is applied to deform the wound clip and to seat it in place. The looped portion 18 has a joining overlying portion 18a which is formed on a sweep of short radius, as viewed in Fig. 16, to pass over the point of merger 20, as is viewed in Figs. 14 and 15. This arrangement tends to hold and lock the prongs at each end of the clip with the middle portion thereof by said overlying arrangement. When extreme pressure must be applied, or if easily deformable material is used, or in any other case where forces tend to deform the loop, it is desirable to cause the looped portion to span the middle portion at the bend line between the loop portion and its associated prong. By forming said overlying portion 18a to rise above the general plane of the loop and of the middle portion, as is shown in Fig. 16, there is no localized pressure upon the tissue adjacent the wound to be sutured. Said arrangement also causes the prongs to lie slightly closer together and to crowd the tissue at the skin surface a little more tightly together than in some of the other embodiments.

Each of the several embodiments of my invention is a simple, inexpensive structure which may be used by a surgeon conveniently and without special tools, if he so desires. In any event, any clamp used does not have to be manipulated in any manner except to close it, because the conformation of the wound clip will cause it to bring the pronged ends toward each other point first and to bend at its exact mid-point so that when it is closed, it will be deformed uniformly.

I claim:

1. A surgical clip comprising a single length of relatively stiff deformable wire, said clip comprising an elongated middle portion and terminal pointed prongs at both ends thereof, a pair of loops each lying in a plane and joining a pointed prong with said middle portion, each loop being associated with its adjacent prong, each prong extending laterally and abruptly outwardly from the plane of its associated loop.

2. A surgical clip comprising a single length of relatively stiff deformable wire, said clip comprising an elongated middle portion and terminal pointed prongs at both ends thereof, a pair of loops each lying in a plane and joining a pointed prong with said middle portion, each loop being associated with its adjacent prong and merging smoothly with said middle portion, each prong extending laterally and abruptly outwardly from the plane of its associated loop.

3. A surgical clip comprising a single length of relatively stiff deformable wire, said clip comprising an elongated middle portion and terminal pointed prongs at both ends thereof, a pair of loops each lying in a plane and joining a pointed prong with said middle portion, each loop being associated with its adjacent prong and diverging abruptly from said pointed prong, each of said pointed prongs subtending substantially a right angle with the plane of its associated loop.

4. The structure defined in claim 1 modified in that said abrupt divergence between a loop and a prong lies adjacent the periphery of said loop.

5. The structure of claim 1 modified in that said abrupt divergence between a loop and a prong lies approximately at the center of said loop, and said loop merges smoothly with the middle portion of said clip.

6. The structure defined in claim 1 modified in that said abrupt divergence between a loop and a prong lies approximately at the center of said loop.

7. The structure defined in claim 1 modified in that said middle portion has a lateral bend therein arranged substantially its mid-point and defining an oblique angle.

8. The structure defined in claim 1 modified in that said middle portion has a lateral bend therein arranged substantially at its mid-point and defining an obtuse angle.

9. The structure defined in claim 1 modified in that said middle portion has a lateral bend therein arranged substantially at its mid-point and defines an oblique angle, said bend being formed upon a circular sweep of relatively short radius.

10. The structure defined in claim 1 modified in that said middle portion has a lateral bend therein arranged substantially at its mid-point and defines an oblique angle, said bend being formed upon a circular sweep of relatively short radius, said bend being formed in the plane of said loops.

11. The structure defined in claim 1 modified in that said middle portion has a lateral bend therein arranged substantially at its mid-point and defines an oblique angle, said bend being formed upon a circular sweep of relatively short radius, said bend being formed in the plane of said loops, said middle portion also being bent substantially at said mid-point in another direction extending substantially normal to said first mentioned plane.

References Cited in the file of this patent

FOREIGN PATENTS

| Number | Country | Date |
| --- | --- | --- |
| 433,976 | Italy | Apr. 19, 1948 |